United States Patent [19]
Brady

[11] Patent Number: 5,530,176
[45] Date of Patent: Jun. 25, 1996

[54] METHOD AND APPARATUS FOR DISPOSING OF HAZARDOUS WASTE MATERIAL IN A CEMENT-PRODUCING KILN

[75] Inventor: David Brady, Statesville, N.C.

[73] Assignee: Pneu-Mech Systems Mfg., Inc., Statesville, N.C.

[21] Appl. No.: 347,898

[22] Filed: Dec. 1, 1994

[51] Int. Cl.⁶ .................. F23G 5/00; F23G 7/00
[52] U.S. Cl. .............. 588/261; 588/205; 110/244; 110/265; 110/264; 110/270
[58] Field of Search .................. 588/261, 205; 110/264, 244, 265, 270

[56]     References Cited

U.S. PATENT DOCUMENTS

| | | | |
|---|---|---|---|
| 3,888,194 | 6/1975 | Kishigami et al. | 110/8 F |
| 4,179,263 | 12/1979 | Jung et al. | 432/1 |
| 4,466,361 | 8/1984 | Henery et al. | 110/346 |
| 4,546,711 | 10/1985 | Kerwin | 110/246 |
| 5,271,340 | 12/1993 | Whitney | 110/346 |

*Primary Examiner*—Arlin S. Phasge
*Attorney, Agent, or Firm*—Shefte, Pinckney & Sawyer

[57]     ABSTRACT

A method and apparatus for disposing of hazardous waste material by burning in a cement-producing kiln includes providing a predetermined quantity of hazardous waste material in a predetermined configuration, and providing an apparatus for aerating and using that apparatus to aerate the hazardous waste material to produce a supplementary fuel having a predetermined density. The method also includes providing an apparatus for injecting the hazardous waste material into the cement kiln and includes the step of injecting the hazardous waste material into the cement kiln at a predetermined injection rate thereby causing the hazardous waste material to burn while suspended in the kiln atmosphere and causing the hazardous waste material to supplement the primary fuel source and maintaining the cement-producing temperature within the kiln. A computer is provided for regulating the amount of primary fuel in relation to the amount of hazardous waste material being burned while maintaining the kiln temperature sufficient to produce cement therein.

24 Claims, 4 Drawing Sheets

METHOD AND APPARATUS FOR DISPOSING OF HAZARDOUS WASTE MATERIAL IN A CEMENT-PRODUCING KILN

BACKGROUND OF THE INVENTION

The present invention relates broadly to methods and apparatus for disposing of hazardous waste material. More specifically, the present invention is directed to a method and apparatus for disposing of hazardous waste material while providing supplemental fuel for a cement-producing kiln.

Hazardous waste material is not necessarily toxic waste material which typically presents a chemical hazard, a nuclear hazard, or both, and its mere presence is dangerous for humans. Hazardous waste material, on the other hand, is waste material which consists of discarded plastics, rubber gloves, paper, paint filters, ground-up air filter material, and other such items which are unsuitable for human consumption or recycling. To be used with the present invention, however, the hazardous waste material must also contain some minimal fuel value that can be realized and applied through burning. The goal of the present invention is to recover and make use of the fuel value inherent in certain hazardous waste material, while simultaneously disposing of the material.

Portland cement, which is conventional cement, is manufactured in rotating kilns which are typically very large and very hot. Such kilns are often more than ten feet in diameter and several hundred feet long. The operating temperature of such a kiln is about 3,000° to 4,000° Fahrenheit. Cement kilns are mounted for rotation with the infeed at one end and the discharge at the other, with both ends closed by hoods. Portland cement is made by heating certain materials, primarily, limestone, in such a rotary kiln. After being fired at the high temperatures associated with the kiln atmosphere, the limestone, sand, ash, and water, which begins as a slurry or sludge, undergoes a chemical reaction at the elevated kiln temperature and becomes formed into rock-like material which is ground to dust to make the cement.

Such cement kilns are typically fueled by oil, coal, gas, or other conventional fuel material which is injected into the kiln. The present invention allows the efficient use of hazardous waste material as a supplemental fuel to provide several advantages. Among these are the reduction of primary fuel required and the destruction of the hazardous waste material while recovering the fuel value therefrom which would otherwise be lost if the waste material were merely buried in a landfill.

Attempts have been made in the past to incorporate the burning of hazardous waste material in cement production. In the past, kilns operated without water have been provided with openings into which buckets of the hazardous waste material would be dropped, bucket and all, to burn in the kiln. This method, while somewhat dangerous to personnel, often resulted in the incomplete burning of the hazardous waste material and the subsequent fueling of the kiln interior by unburned hazardous waste. Additionally, the buckets were wasted.

A further attempt was made to inject the hazardous waste material into the kiln using a pipe. Typically, the primary fuel is fed into the kiln through an extended pipe which creates a nozzle, in turn, creating a fire storm inside the kiln fueled by moving primary fueling material. A second burner tube was inserted adjacent the primary burner tube in the kiln and the hazardous waste material was injected through the secondary burner tube. This proved problematic as well because the bulk hazardous waste material would not fully burn in the atmosphere of the kiln resulting in inefficient use of the material. Further, the burner pipe eventually became clogged with unburned waste material along the inner wall of the tube. Therefore, the old method of injecting as much hazardous waste material into the kiln as could be forced through the tube resulted in the disposal of a portion of the hazardous waste material. However, the equipment used could not be effectively maintained over an extended operational period due to the aforesaid fouling by the hazardous waste material.

SUMMARY OF THE INVENTION

It is accordingly an object of the present invention to provide a method and apparatus for disposing of hazardous waste material while providing supplemental fuel for a cement-producing kiln which addresses the above-discussed problems.

More specifically, it is an object of the present invention to provide a method and apparatus for burning hazardous waste material suspended in a kiln atmosphere while monitoring and regulating the amount of hazardous waste material introduced into the kiln.

To that end, a method for disposing of hazardous waste material by burning includes the steps of providing a kiln for producing cement operational at a predetermined cement producing temperature and having a kiln atmosphere characterized by the cement producing temperature and fired by a primary fuel source; providing a predetermined quantity of fungible hazardous waste material in a predetermined configuration; and providing an assembly for aerating the hazardous waste material. Further, the method includes aerating the hazardous waste material to produce a fuel product having a predetermined density; providing an arrangement for injecting the hazardous waste material into the kiln, and injecting the hazardous waste material into the kiln at a predetermined injection rate, thereby causing the hazardous waste material to burn while suspended in the kiln atmosphere and causing the hazardous waste material to supplement the primary fuel while maintaining the cement producing temperature within the kiln.

The method further preferably includes the steps of providing an assembly for supplying predetermined amounts of the hazardous waste material for injection into the kiln; supplying a predetermined amount of hazardous waste material for injection into the kiln; providing an assembly for determining the amount of hazardous waste material injected into the kiln; determining the amount of hazardous waste material injected into the kiln; providing an assembly for monitoring the thermal performance of the kiln; monitoring the thermal performance of the kiln; and adjusting the amount of hazardous waste material supplied by the supply assembly responsive to input from the determining assembly and the monitoring assembly to maintain the thermal performance of the kiln at a predetermined level. Preferably, the step of providing the determining means includes provided a scale and the step of determining the amount of hazardous waste material includes weighing the hazardous waste material using the scale. Further, the step of providing a scale includes providing a driven conveyor belt having at least one roller associated with and providing input to the scale. The step of adjusting the amount of hazardous waste material includes the step of using a preprogrammed computer to perform the steps of determining the thermal performance of the kiln; and adjusting the relative amounts of the primary fuel and the hazardous waste material to maintain the thermal performance of the kiln at a predetermined level.

A second preferred embodiment of the present invention provides a method for fueling a kiln associated with the production of cement with the fueling method including the steps of providing a kiln for producing cement having at least two fuel access openings; injecting a primary fuel into the kiln through one of the at least two openings to cause the fuel to burn for firing the kiln and elevating the temperature of the kiln atmosphere to a predetermined temperature; providing a predetermined quantity of hazardous waste material; providing an assembly to aerate the hazardous waste material; aerating the hazardous waste material to provide a predetermined quantity of hazardous material having a predetermined density; and injecting the aerated hazardous waste material into the kiln through the other of the at least two fueling access openings to cause the hazardous waste material to burn while suspended in the kiln atmosphere thereby using the hazardous waste material as a secondary fuel source for the kiln. Further, the step of providing an assembly for aerating the hazardous waste material includes providing a predetermined length of enclosed screw conveyors and the step of aerating the hazardous waste material includes moving the hazardous waste material along the screw conveyors thereby allowing the agitation of the hazardous waste material to reduce the density of the hazardous waste material by mixing the hazardous waste material with air in the enclosed screw conveyor.

The method of fueling the kiln further includes the step of providing an injection tube extending a predetermined distance into the kiln and providing an assembly to force the hazardous waste material through the injection tube into the kiln and the step of injecting the hazardous waste material into the kiln includes forcing the hazardous waste material through the injection tube a predetermined distance into the kiln for burning the hazardous waste material while the hazardous waste material is suspended in the kiln atmosphere. Further, the step of aerating the hazardous waste material includes mixing the hazardous waste material with air until the hazardous waste material injected into the kiln is generally sixty parts air to every one part hazardous waste material.

The method of fueling the kiln further includes the steps of monitoring the temperature of the kiln atmosphere and regulating the respective quantities of primary fuel and hazardous waste material being injected into the kiln to maintain the monitored kiln temperature at a predetermined temperature value sufficient to sustain cement production and sufficient to cause the hazardous waste material to burn suspended in the kiln atmosphere. Further, the method includes the steps of determining and recording the quantity of hazardous waste material being injected into the kiln.

An apparatus for supplementarily fueling a kiln associated with the production of cement with hazardous waste material to cause the destruction of the hazardous waste material, the kiln being of the type including an assembly for injecting a primary fueling material thereinto to cause the primary fueling material to burn thereby elevating the temperature of the atmosphere within the kiln to a predetermined temperature value, the apparatus including an assembly for aerating a predetermined quantity of hazardous waste material for reducing the density of the hazardous waste material to a predetermined value; an assembly for determining a predetermined quantity of hazardous waste material; and an assembly for injecting the predetermined quantity of aerated hazardous waste material into the kiln separately from the injection of the primary fueling material to cause the hazardous waste material to burn suspended in the kiln atmosphere, thereby causing the hazardous waste material to act as a supplementary fuel for the kiln and to dispose of the hazardous waste material. Further, the apparatus includes an assembly for monitoring the temperature inside the kiln, an assembly for regulating the respective amounts of the primary fueling material and the hazardous waste material being injected into the kiln to maintain the monitored kiln atmospheric temperature at a predetermined temperature value sufficient to sustain cement production and sufficient to cause the hazardous waste material to burn suspended in the kiln atmosphere. The apparatus further includes a scale to determine the quantity of hazardous waste material being injected into the kiln and the scale includes a driven conveyor belt having at least one roller associated with and providing input to the scale. The assembly further includes a preprogrammed computer to monitor the temperature inside the kiln, record the quantity of hazardous waste material being injected into the kiln and to regulate the relative amounts of primary fueling material and hazardous waste material being injected into the kiln to control cement production and hazardous waste material disposal.

The assembly for injecting hazardous waste material into the kiln preferably includes a tube extending a predetermined distance into the kiln atmosphere and a blower assembly for blowing the hazardous waste material through the tube into the kiln atmosphere. The apparatus of the present invention also includes a metering bin for storing a predetermined quantity of the hazardous waste material and for delivering a predetermined quantity of hazardous waste material to the scale for weighing prior to injecting the hazardous waste material into the kiln.

By the above, the present invention provides a method and apparatus which will simultaneously act to dispose of hazardous waste material while providing a supplementary fuel for a cement-producing kiln. The present invention thereby provides an efficient method for the destruction of hazardous waste for an enhanced environmental response and a method of saving primary kiln fueling material.

DESCRIPTION OF THE PREFERRED EMBODIMENT

Figure 1:
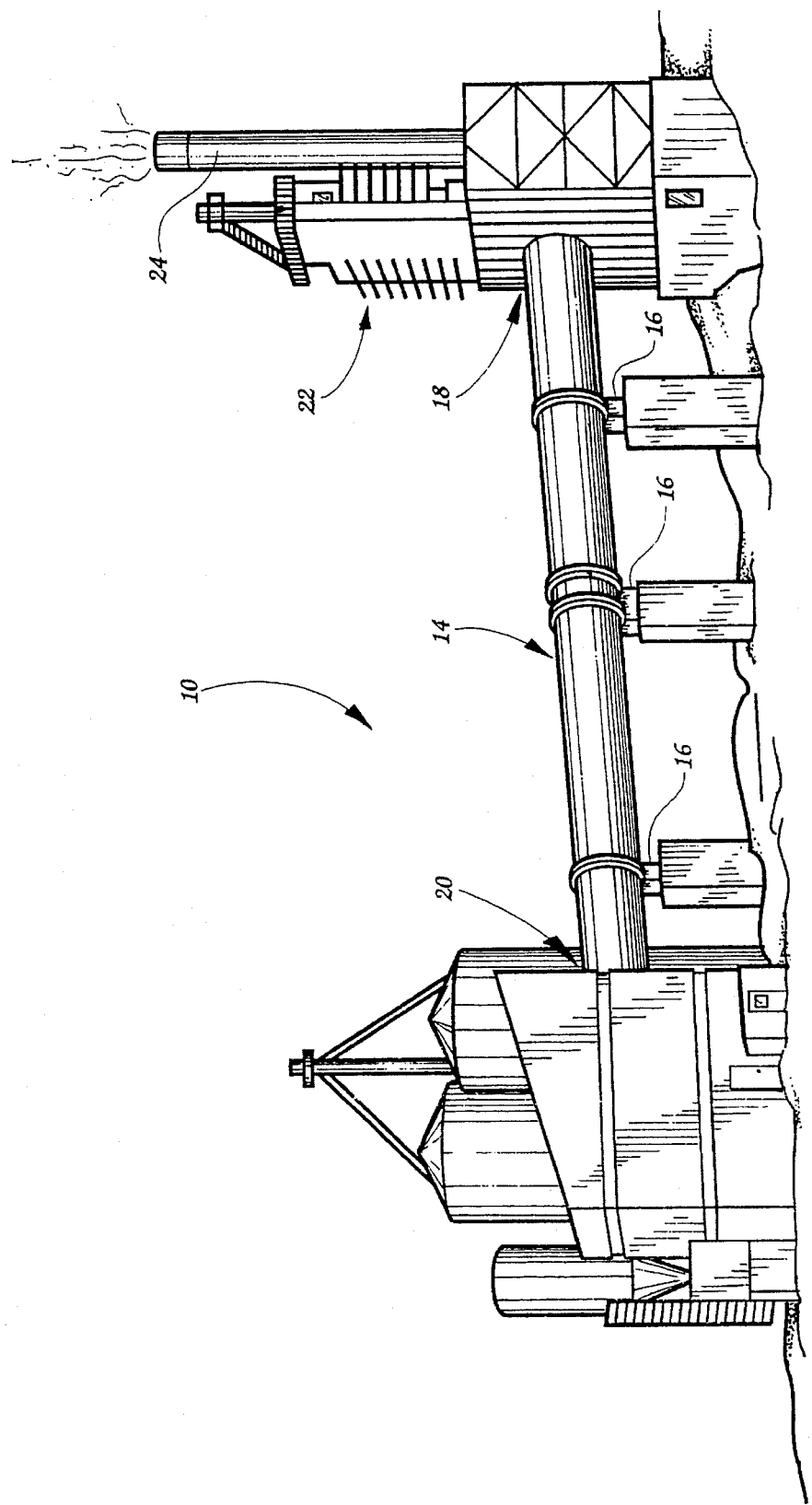
FIG. 1 is a perspective view of a typical cement producing facility.

Turning now to the drawings, and more particularly, to FIG. 1, a typical conventional cement producing facility is indicated generally at 10 and includes a drum in the form of a rotary kiln 14 which is rotatably mounted on driving support 16. The kiln 14 is mounted with an axis of rotation at an angle to the horizontal and extends from an elevated feed end 18 to a lower discharge end 20. At the feed end 18, raw material, such as sand, ash, limestone, and water, are fed from hoppers 22 through a chute (not shown) into the kiln as a slurry or sludge. As the kiln 14 is rotated, the materials fall by gravity along the kiln 14 toward the discharge end 20. At the discharge end 20, fuel is introduced through a burner tube 76 (see FIG. 4) which is located at the axis of rotation of the kiln 14. The fuel, namely, coal, oil, gas, or other high fuel value material is burned to create a high temperature atmosphere within the kiln 14, typically on the order of 3,000° to 4,000° Fahrenheit. The raw materials are thereby heated to produce the cement clinker, which falls from the kiln 14 at the discharge end 20 by gravity and is discharged into a heat recuperator through which air is drawn into the kiln 14 for combustion. The passage of air through the heated product recovers heat from the product to produce the higher temperatures within the kiln 14, hence saving fuel. The kiln is thus a countercurrent furnace with solids moving from top to bottom and the exhaust gases moving from bottom to top where they go up a stack 24.

Figure 2:
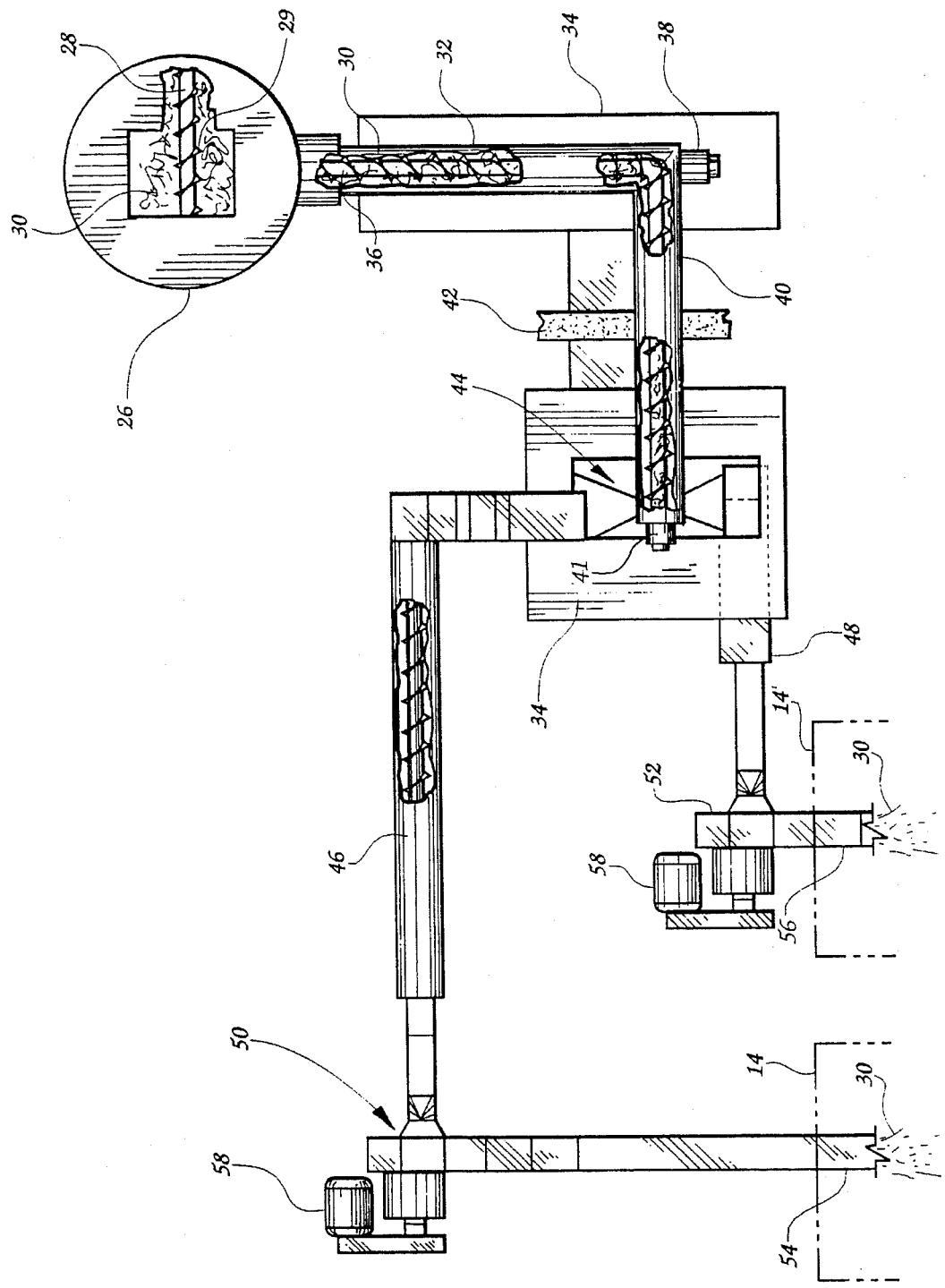
FIG. 2 is a top plan view of an apparatus for disposing of hazardous waste material by burning in a cement-producing kiln according to the preferred embodiment of the present invention.

Turning now to FIG. 2, an apparatus for practicing the method of the present invention is illustrated and associated with two kilns 14,14' which are shown diagrammatically, yet may be the typical cement producing kiln illustrated in FIG. 1.

With continued reference to FIG. 2, it should be noted that the fueling apparatus associated with the present invention may be mounted within the cement producing facility in any convenient form. The only true requirement for compatibility with any given cement production facility is that the burner tubes 54,56 extend into each kiln 14,14' adjacent the primary fuel burner tubes 76 (see FIG. 4). The apparatus includes a hazardous waste material storage hopper 26 which is a generally cylindrical hopper-like tank having at least one mixing screw 28 disposed therein. The mixing screw 28 is a generally elongate rod-like member having a continuous blade 29 formed helically along the length of the screw 28. This general construction will remain true for subsequent screw conveyors which will be disclosed in greater detail hereinafter. The storage hopper 26 is provided for receiving hazardous waste material 30 in bulk.

In order to both aerate the hazardous waste material 30 and to transport it to the kiln, a series of screw conveyors is provided. A first screw conveyor 32 is mounted to a screw conveyor support 34 and is joined to the storage hopper 26. The first screw conveyor 32 includes an internal screw 36 which is formed as previously described. The internal screw 36 is housed within a generally cylindrical housing which is preferably approximately twelve inches in diameter. Due to the scale of the cement plant, the first screw conveyor 32 is shown in a shortened state but it is to be understood that the length of the screw conveyor is dependent upon the positioning of the apparatus within any given cement plant. The internal screw 36 is driven by an electric motor 38 attached to one end thereof.

Figure 3:
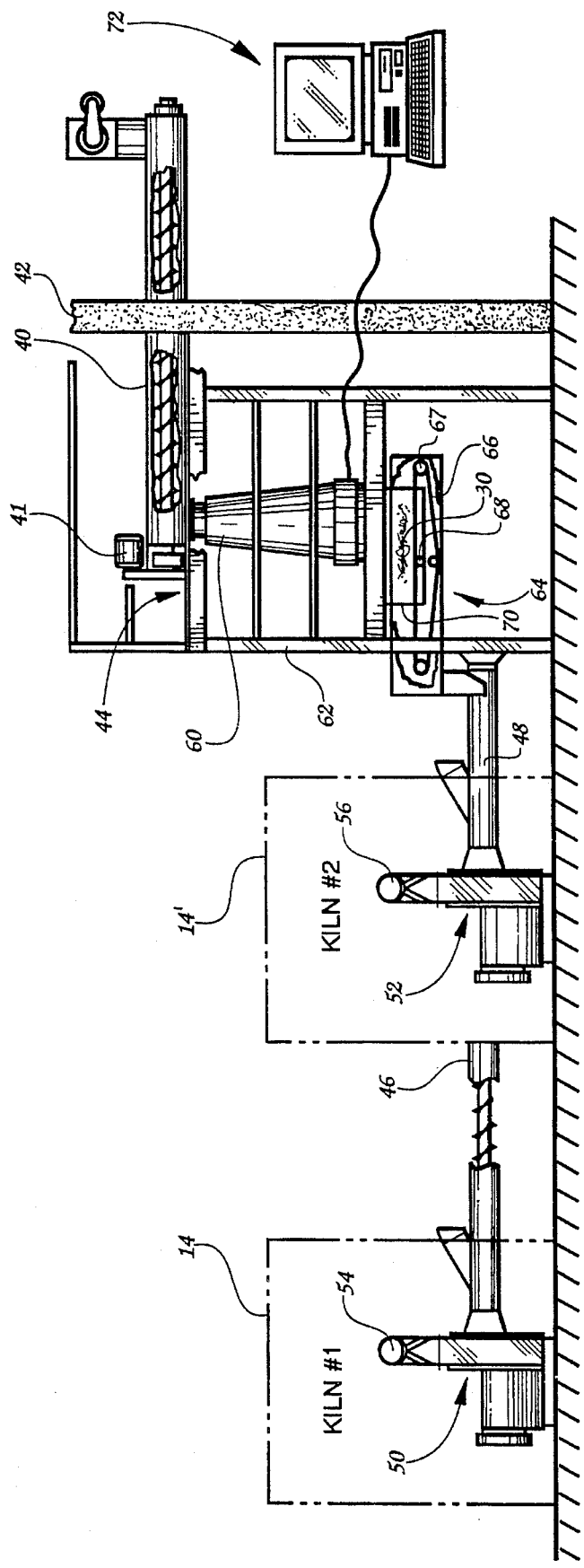
FIG. 3 is a side diagrammatic view of the apparatus illustrated in FIG. 2.
Figure 4:
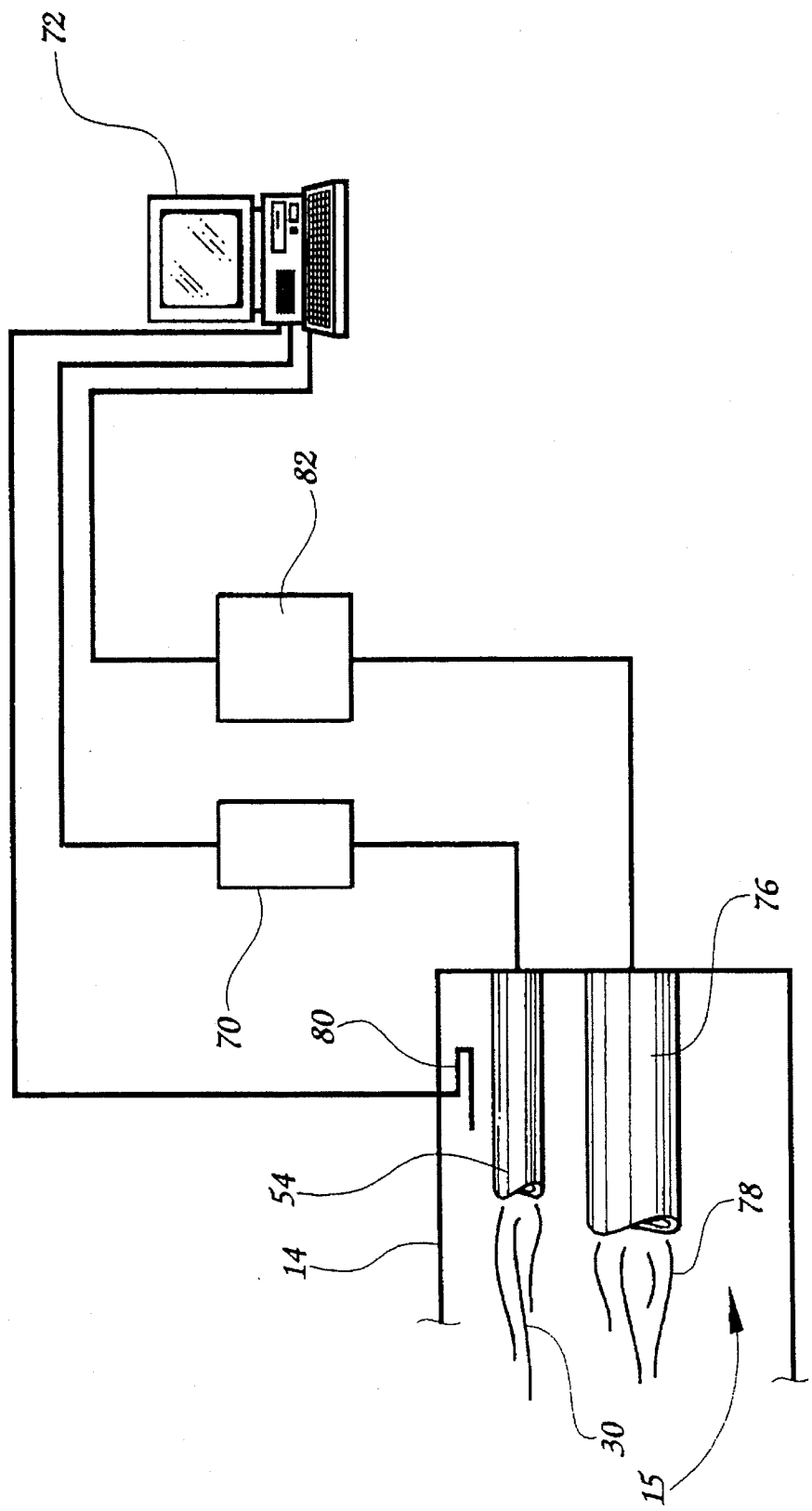
FIG. 4 is a diagrammatic view of the fuel monitoring and regulating system associated with the apparatus illustrated in FIG. 1.

The first screw conveyor is shown in FIG. 2 as including a right angle turn to deliver the material into the second screw conveyor 40, which is formed similarly to the first screw conveyor 36. The second screw conveyor 40 is driven by a conventional motor 41 and is shown penetrating a wall 42 of the cement plant. This is preferential so that the storage bin 26 may be located outside any cement plant housing to facilitate the onload of hazardous waste material 30 in bulk. The second screw conveyor 40 feeds the material to a metering area 44 for dispensing to the kilns 14,14'. The metering area, which will be discussed in greater detail hereinafter, is best illustrated in FIGS. 3 and 4. From the metering area 44, the material is weighed, as will be seen in greater detail hereinafter, divided and a portion of the material is forced into a third screw conveyor 46 and a portion is forced into a fourth screw conveyor 48 to deliver the material to injection blowers 50,52, respectively, for injection into the kilns 14,14' through elongate burner tubes 54,56. It should be noted that the typical screw conveyor is, as stated, twelve inches in diameter and the length may vary upwardly to forty-eight, fifty, or even sixty feet or beyond, depending upon the particular configuration required of the cement producing facility into which the present invention is to be installed. The screw conveyors 46,48 terminate at fan-based injectors 50,52, which are driven by electric motors 58 that are typically on the order of twenty horsepower. These motors are sufficient to blow the hazardous waste material/air mixture into the kilns sufficient to cause the material to be burned while suspended in the kiln atmosphere.

Turning now to FIG. 3, a more detailed view of the metering area 44 is illustrated. As can be seen, the second screw conveyor 40 is terminated at the metering area 44. The metering area 44 includes a metering bin 60 which is suspended in a generally rectangular floorstanding framework-like support structure 62. The metering bin 60 is an inverted frusto-conical structure which acts as a holding bin for hazardous waste material which has been conveyed from the storage hopper 26 in preparation for injection into the kilns 14,14'. The metering bin 60 includes internal screws (not shown) which are similar to the screw conveyors which operate to maintain the fluffed or aerated state of the hazardous waste material prior to injection into the kilns 14,14'.

Since the disposal of hazardous waste material is a regulated endeavor, the quantity of hazardous waste material injected into the kilns must be known. To that end, a so-called "weigh belt" is provided. The weigh belt 64 consists of a conveyor belt 66 trained around drive rollers 67, one of which is a weighing roller 68. The weighing roller 68 is operatively connected to scale 70 which is schematically illustrated in FIG. 3. The weighing roller 68 is positioned in abutment with the area of the conveyor belt 66 that receives hazardous waste material 30 from the metering bin 60. As the quantity of hazardous waste material 30 deposited on the belt increases, the weigh roller 68 is driven downwardly and, due to its operative connection with the scale 70, the scale 70 indicates an increasing weight. This information is fed into a computer 72 which is preprogrammed to record the weight of the hazardous material 30 supplied to the kilns 14,14'.

The computer 72 is also preprogrammed to monitor and regulate the fuel supply. With reference to FIG. 4, a kiln 14 is illustrated diagrammatically and includes an interior cavity 15 which has, extending thereinto, a hazardous waste material injector tube 54 which is illustrated having hazardous waste material 30 being emitted therefrom. A primary fuel delivery tube 76 is illustrated as injecting a primary fuel 78 into the kiln atmosphere 15. A temperature probe 80 is also provided to monitor the temperature inside the kiln atmosphere. The primary fuel 78 is supplied from a conventional primary fuel supply unit 82. The computer 72 receives input along conventional data lines from the primary fuel supply 82, the scale 70, and the temperature probe 80. According to a program, the computer 72 will regulate the amount of primary fuel 78 and hazardous waste material 30 being provided to fuel the kiln 14 based on the kiln temperature received from the temperature probe 80. In this manner, efficient burning of the primary fuel and the hazardous waste material may be maintained while producing cement.

The method of the present invention may be practiced using the above-discussed apparatus. With reference to FIGS. 2, 3, and 4, the hazardous waste material 30 is provided in bulk to the storage hopper 26. The screw conveyors are caused to rotate, which due to the helical nature of the blades 29, the hazardous waste material 30 is advanced through the conveyors. As the material is advanced, it is being churned, mixed, fluffed, or otherwise aerated as the mixture is driven along within the screw conveyor housings. It should be noted that while the illustrations show the screw conveyors to be relatively short they are, in fact, on the order of forty to fifty feet long, dependent on the requirements imposed by the cement-producing facility. The screw conveyors must, however, be long enough to fully aerate the material so that when the material is injected through the burner tubes 54,56, it is approximately sixty to seventy parts air to every one part of hazardous waste material. The screw conveyors deposit the hazardous waste material 30 into the metering bin 60 and from there it is deposited onto the weight belt 64 in predetermined quantities. As previously discussed, the computer 72 monitors and records the quantity of hazardous waste material being deposited in the final screw conveyors 46,48 prior to injection into the kilns 14,14'. The material is then conveyed from the weight belt 64 through the final screw conveyors 46,48 into the blower units 54,56 which accelerate the material and drive it through the burner tubes 54,56 to be injected into the kiln atmosphere 15,15' at a rate of approximately 5,000 cubic feet per minute (cfm), dependent on the fuel requirements of the kiln.

The computer 72 continually monitors and records the quantity of hazardous waste material being deposited on the weigh belt 64 and as well as the temperature of the kiln atmosphere 15. Based on preprogrammed standards, the computer regulates the flow of primary fuel 78 and hazardous waste material 30 to maintain the temperature of the atmosphere 15 inside the kiln 14,14' in the range of 3,000° to 4,000° Fahrenheit. The computer must provide control sufficient to maintain the temperature inside the kiln at a temperature both sufficient to produce cement and sufficient to burn the hazardous waste material while it is suspended in the kiln atmosphere. In this manner, the hazardous waste material is disposed of in a most efficient manner and the kiln is provided with a supplemental fuel source, thereby conserving the primary fuel at the expense of hazardous waste material.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A method for disposing of hazardous waste material by burning comprising the steps of:

providing a kiln for producing cement operational at a cement producing temperature and having a kiln atmosphere characterized by said cement producing temperature and fired by a primary fuel source;

providing a quantity of fungible hazardous waste material;

providing means for aerating said hazardous waste material;

aerating said hazardous waste material to produce a supplementary fuel product having a predetermined density commensurate with a density at which a said hazardous waste material will burn while suspended in the kiln atmosphere;

providing means for injecting said hazardous waste material into said kiln;

injecting said hazardous waste material into said kiln; and burning said hazardous waste material while said hazardous waste material is suspended in the kiln atmosphere to destroy said hazardous waste material and to supplement said primary fuel in maintaining said cement producing temperature within said kiln.

2. A method for disposing of hazardous waste material according to claim 1 and further comprising the steps of:

providing means for supplying said hazardous waste material for injection into said kiln;

supplying hazardous waste material for injection into said kiln;

providing means for determining the amount of said hazardous waste material injected into said kiln;

determining the amount of hazardous waste material injected into said kiln;

providing means for monitoring the thermal performance of said kiln;

monitoring the thermal performance of said kiln; and adjusting the amount of hazardous waste material supplied by said supply means responsive to input from said determining means and said monitoring means to maintain said thermal performance of said kiln at a cement producing level.

3. A method for disposing of hazardous waste material according to claim 2 wherein the step of providing said determining means includes providing a scale and the step of determining said amount of said hazardous waste material includes weighing said hazardous waste material using said scale.

4. A method for disposing of hazardous waste material according to claim 3 wherein the step of providing a scale includes providing a driven conveyor belt having at least one roller associated with and providing input to said scale.

5. A method for disposing of hazardous waste material according to claim 2 wherein the step of adjusting the amount of hazardous waste material includes the step of using a preprogrammed computer to perform the steps of determining the thermal performance of said kiln and adjusting the relative amounts of said primary fuel and said hazardous waste material to maintain said thermal performance of said kiln at a predetermined level.

6. A method for disposing of hazardous waste material according to claim 1 wherein the step of providing means for aerating said hazardous waste material includes providing enclosed screw conveyors and the step of aerating said hazardous waste material includes moving said hazardous waste material along said screw conveyors thereby causing the agitation of said hazardous waste material to reduce the density of said hazardous waste material by mixing said hazardous waste material with air in said enclosed screw conveyor.

7. A method for disposing of hazardous waste material according to claim 1 and further comprising the step of providing an injector tube extending into said kiln and providing means to force said hazardous waste material through said injector tube into said kiln and the step of injecting said hazardous waste material into said kiln includes forcing said hazardous waste material through said injector tube into said kiln for the burning of said hazardous waste material suspended in the kiln atmosphere.

8. A method for disposing of hazardous waste material according to claim 1 wherein the step of aerating said hazardous waste material includes mixing said hazardous waste material with air until the hazardous waste material injected into said kiln is generally sixty parts air to every one part hazardous waste material.

9. A method for fueling a kiln associated with the production of cement, said method comprising the steps of:

providing a kiln for producing cement having at least two fueling access openings and an internal atmosphere, injecting a primary fuel into said kiln through one of said at least two fueling access openings to cause said fuel to burn for firing said kiln and elevating the temperature of the kiln atmosphere to a predetermined temperature;

providing a quantity of hazardous waste material;

providing means to aerate said hazardous waste material;

aerating said hazardous waste material to provide a quantity of hazardous waste material having a predetermined density; and injecting said aerated hazardous waste material into said kiln through the other of said at least two fueling access openings to cause said hazardous waste material to burn while suspended in the kiln atmosphere, thereby using said hazardous waste material as a secondary fuel source for said kiln.

10. A method for fueling a kiln according to claim 9 and further comprising the steps of:

monitoring the temperature of the kiln atmosphere; and adjusting the relative quantity of primary fuel and said hazardous waste material being injected into said kiln to maintain the monitored kiln temperature at a predetermined temperature sufficient to sustain cement production and sufficient to cause said hazardous waste material to burn suspended in the kiln atmosphere.

11. A method for fueling a kiln according to claim 10 and further comprising the step of determining and recording the quantity of said hazardous waste material being injected into said kiln.

12. A method for fueling a kiln according to claim 11 wherein the step of providing said determining means includes providing a scale and the step of determining said amount of said hazardous waste material includes weighing said hazardous waste material using said scale.

13. A method for fueling a kiln according to claim 12 wherein the step of providing a scale includes providing a driven conveyor belt having at least one roller associated with and providing input to said scale.

14. A method for fueling a kiln according to claim 10 wherein the step of adjusting the relative amounts of said primary fuel and said hazardous waste material includes the step of using a preprogrammed computer to perform the steps of determining the thermal performance of said kiln; and adjusting the relative amounts of said primary fuel and said hazardous waste material to maintain said thermal performance of said kiln at a predetermined level.

15. A method for fueling a kiln according to claim 9 wherein the step of providing means for aerating said hazardous waste material includes providing enclosed screw conveyors and the step of aerating said hazardous waste material includes moving said hazardous waste material along said screw conveyors thereby allowing the agitation of said hazardous waste material to reduce the density of said hazardous waste material by mixing said hazardous waste material with air in said enclosed screw conveyors.

16. A method for fueling a kiln according to claim 9 and further comprising the step of providing an injector tube extending into said kiln and providing means to force said hazardous waste material through said injector tube into said kiln and the step of injecting said hazardous waste material into said kiln includes forcing said hazardous waste material through said injector tube into said kiln for the burning of said hazardous waste material suspended in the kiln atmosphere.

17. A method for fueling a kiln according to claim 9 wherein the step of aerating said hazardous waste material includes mixing said hazardous waste material with air until the hazardous waste material injected into said kiln is generally sixty parts air to every one part hazardous waste material.

18. An apparatus for supplementarily fueling a kiln associated with the production of cement with hazardous waste material to cause the destruction of said hazardous waste material, the kiln being of the type including an assembly for injecting a primary fueling material thereinto to cause said primary fueling material to burn thereby elevating the temperature of atmosphere within said kiln to a predetermined temperature, said apparatus comprising:

means for aerating a quantity of hazardous waste material for reducing the density of said hazardous waste material to a predetermined value;

means for injecting said aerated hazardous waste material into the kiln separately from the injection of the primary fueling material to cause said hazardous waste material to burn suspended in the kiln atmosphere thereby causing said hazardous waste material to act as a supplementary fuel for said kiln and to dispose of said hazardous waste material.

19. An apparatus for supplementarily fueling a kiln according to claim 18 and further comprising means for monitoring the temperature of the atmosphere inside the kiln, means for regulating the relative amounts of said primary fueling material and said hazardous waste material being injected into said kiln to maintain the monitored kiln atmosphere temperature at a predetermined temperature sufficient to sustain cement production and sufficient to cause said hazardous waste material to burn suspended in the kiln atmosphere.

20. An apparatus for supplementarily fueling a kiln according to claim 19 and further comprising a scale to determine the quantity of said hazardous waste material being injected into the kiln.

21. An apparatus for supplementarily fueling a kiln according to claim 20 wherein said scale includes a driven conveyor belt having at least one roller associated with and providing input to said scale.

22. An apparatus for supplementarily fueling a kiln according to claim 20 and further comprising a metering bin for storing a quantity of said hazardous waste material and for delivering a quantity of hazardous waste material to said scale for weighing prior to injecting said hazardous waste material into the kiln.

23. An apparatus for supplementarily fueling a kiln according to claim 19 and further comprising a preprogrammed computer to perform the steps of determining the thermal performance of said kiln; and adjusting the relative amounts of said primary fuel and said hazardous waste material to maintain said thermal performance of said kiln at a predetermined level.

24. An apparatus for supplementarily fueling a kiln according to claim 19 wherein said means for injecting hazardous waste material into the kiln includes a tube extending a predetermined distance into said kiln atmosphere and blower means for blowing said hazardous waste material through said tube into said kiln atmosphere.

* * * * *